(12) United States Patent
Farkas

(10) Patent No.: US 12,130,605 B2
(45) Date of Patent: Oct. 29, 2024

(54) SYSTEM AND METHOD FOR COMPUTERIZED PROGRAMING OF A CONTROLLER OF AN INDUSTRIAL SYSTEM

(71) Applicant: CODIQ 4.0 LTD, Kibutz Kabri (IL)

(72) Inventor: Javier Bruno Farkas, Kibutz Kabri (IL)

(73) Assignee: CODIQ 4.0 LTD, Kibutz Kabri (IL)

( * ) Notice: Subject to any disclaimer, the term of this patent is extended or adjusted under 35 U.S.C. 154(b) by 531 days.

(21) Appl. No.: 17/283,676

(22) PCT Filed: Sep. 25, 2019

(86) PCT No.: PCT/IL2019/051056
§ 371 (c)(1),
(2) Date: Apr. 8, 2021

(87) PCT Pub. No.: WO2020/075157
PCT Pub. Date: Apr. 16, 2020

(65) Prior Publication Data
US 2021/0382450 A1  Dec. 9, 2021

Related U.S. Application Data

(60) Provisional application No. 62/743,585, filed on Oct. 10, 2018.

(51) Int. Cl.
*G05B 19/04* (2006.01)
*G05B 19/042* (2006.01)

(52) U.S. Cl.
CPC ........... *G05B 19/0426* (2013.01); *G05B 2219/23258* (2013.01); *G05B 2219/23291* (2013.01)

(58) Field of Classification Search
CPC ...... G05B 19/0426; G05B 2219/23258; G05B 2219/23291
See application file for complete search history.

(56) References Cited

U.S. PATENT DOCUMENTS 8,667,078 B2 *  3/2014  Karaffa ............ G05B 19/41845
                                                        709/217
8,903,520 B2 * 12/2014  Karaffa ............... G05B 19/056
                                                        717/110
(Continued)

FOREIGN PATENT DOCUMENTS

EP     0 718 727 B1    2/2000
EP     2 068 214 A1    6/2009

*Primary Examiner* — Santosh R Poudel
(74) *Attorney, Agent, or Firm* — Vorys, Sater, Seymour, and Pease LLP; Anthony P. Venturino; Maryellen Feehery Hank

(57) ABSTRACT

Disclosed are a computerized system and a method of programing a controller of an industrial system. The method may include: receiving, from the controller, data defining two or more controllable elements included in the industrial system; generating logical connections between the two or more controllable elements based on the received data and the graphical presentation; receiving, from a user interface included in the computerized system, one or more graphical markers presenting an operation sequence of the two or more controllable elements; and converting the graphical markers to an executable code configured to control a controller of the industrial system to control the two or more controllable elements according to the operation sequence.

19 Claims, 6 Drawing Sheets

(56) References Cited

U.S. PATENT DOCUMENTS

| | | | |
|---|---|---|---|
| 9,417,626 B2 | 8/2016 | Jones et al. | |
| 2004/0075689 A1* | 4/2004 | Schleiss | G05B 19/0428 |
| | | | 715/771 |
| 2004/0217654 A1 | 11/2004 | Maturana et al. | |
| 2005/0222698 A1* | 10/2005 | Eryurek | G06F 8/34 |
| | | | 700/90 |
| 2007/0168060 A1* | 7/2007 | Nixon | G06N 5/04 |
| | | | 700/83 |
| 2009/0112350 A1* | 4/2009 | Yuan | G05B 19/41835 |
| | | | 700/117 |
| 2010/0262265 A1* | 10/2010 | Karaffa | G05B 19/056 |
| | | | 700/87 |
| 2015/0051871 A1 | 2/2015 | Mimura | |
| 2017/0092231 A1* | 3/2017 | Hoa | G06F 3/167 |
| 2018/0187255 A1 | 7/2018 | Drews | |
| 2022/0075918 A1 | 3/2022 | McGregor et al. | |

* cited by examiner

SYSTEM AND METHOD FOR COMPUTERIZED PROGRAMING OF A CONTROLLER OF AN INDUSTRIAL SYSTEM

CROSS-REFERENCE TO RELATED APPLICATIONS

This application is a National Phase Application of PCT International Application No. PCT/IL2019/051056, International Filing Date Sep. 25, 2019, claiming the benefit of U.S. Provisional Patent Application 62/743,585, filed Oct. 10, 2018 which is hereby incorporated by reference.

FIELD OF THE INVENTION

The present invention generally relates to controlling an industrial system. More particularly, the present invention relates to systems and methods for generating codes for controlling an industrial system.

BACKGROUND OF THE INVENTION

Almost all modern industrial systems are monitored and controlled automatically by at least one controller. Programing the controller to control each controllable element in the industrial system, requires the involvement of a professional programmer armed with the knowledge of the specific code required for programing each controller (e.g., different manufacturers use different programing languages). Any change in the system, such as adding new operation sequence for various elements, require the expertise of the professional programmer. This process is both expensive and time consuming.

Accordingly, there is a need for a simple programming tool that may allow nonprofessionals to program and reprogram the controller of an industrial system.

SUMMARY OF THE INVENTION

Some aspects of the invention may be directed to a computerized system and method of programing a controller of an industrial system. In some embodiments, the method may include: receiving, from the controller, data defining two or more controllable elements included in the industrial system; generating logical connections between the two or more controllable elements based on the received data and the graphical presentation; receiving, from a user interface included in the computerized system, one or more graphical markers presenting an operation sequence of the two or more controllable elements; and converting the graphical markers to an executable code configured to control a controller of the industrial system to control the two or more controllable elements according to the operation sequence.

In some embodiments, the controller may include software modules of each controllable element and the method may further include uploading a code to the software module of each one of the two or more controllable elements. In some embodiments, the code comprises instructions that allow an external controller to reprogram the software module.

In some embodiments, the method may further include: receiving a graphical design of the industrial system; and generating the logical connections also based on the graphical design of the industrial system. In embodiments, generating the logical connection between the two or more controllable elements may include: identifying a connection points of each controllable element, form the graphical presentation; defining a flow direction between at least two of the identifying connection points, based on the received data.

In some embodiments, the method may further include receiving a request to manufacture a specific product, using the industrial system; and updating the operation sequence to manufacture the specific product. In some embodiments, receiving the request to manufacture a specific product may include: receiving a definition of one of: a number of units of the specific product or a predetermined amount of the specific product; and receiving a list and amounts of at least one of: ingredients and components for manufacturing the specific product.

In some embodiments, the method may further include: generating a simulated model of the industrial system operated according to the operation sequence; and assessing the operation sequence based on a product of the simulated model. In some embodiments, the method may further include automatically programming the controller of the industrial system with the executable code. In some embodiments, the operation sequence may be configured to perform a predetermined task.

In some embodiments, the method may further include receiving, from a user interface, one or more additional graphical markers presenting one of: operation sub-sequences and operation parameters of the two or more controllable elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
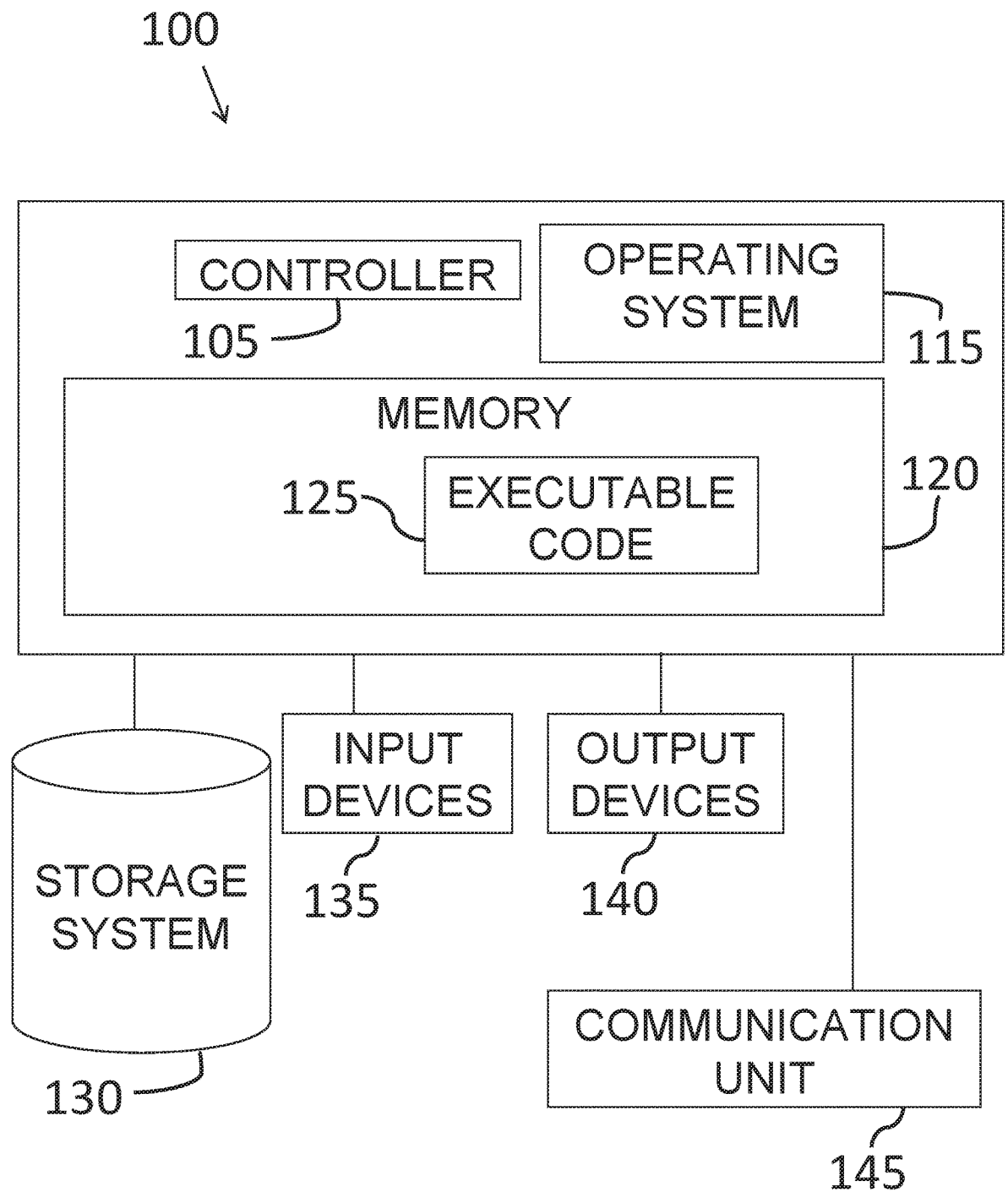
FIG. 1 shows a block diagram of a computing device according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Some aspects of the invention may be related to a system and method that may allow any user to generate codes for programing a controller (e.g., a Programmable Logic Controller (PLC)) of an industrial system. The user, that does not need to be a professional programmer, may use a simple and friendly graphical user interface (GUI) for defining various operation sequence. For example, if a cleaning sequence of a tank in the industrial system is to be performed (e.g., a cleaning sequence that was not previously programmed into the PLC system) a shift manager may use a GUI of a system according to embodiments of the invention to define the cleaning sequence. The system may than convert the defined cleaning sequence into a PLC code and automatically program the controller to perform the cleaning sequence. The system may further allow the user to conduct an "offline" simulation of the operation sequence prior to converting the sequence into a code.

A system according to embodiments of the invention may receive a graphical presentation of the industrial system and data that includes a definition and the operation parameters of each device or elements. The system may than generate a plan of the industrial system that includes the devices and controllable elements. For each element and controllable element, the system may further generate connection points that define the way the particular device/element can be connected to other devices/elements of the system. This plan can be graphically presented to the user that may further use simple graphical tools to program the PLC controller as disclosed herein.

Reference is made to FIG. 1, which is a schematic block diagram of an example of a computing device, according to some embodiments of the invention. Computing device 100 may be or may be included in a system for generating codes for controlling an industrial system. Computing device 100 may include a controller or processor 105 (e.g., a central processing unit processor (CPU), a graphics processing unit (GPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may include any tasks, codes and instructions to perform methods according to some embodiments of the invention, for example, a method of generating codes for programing a controller of an industrial system (e.g., the method of FIG. 3). Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120. Storage 130 and/or memory 120 may store tables/lists including data defining two or more controllable elements, for example, operation parameters, upper and lower limits, scheduling, timing, sub-stages of each element and the like. In some embodiments, storage 130 and/or memory 120 may store graphical presentations of the industrial systems.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. In some embodiments, both input device 135 and output device 140 may be included in a single GUI.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU), GPUs, or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Figure 2:
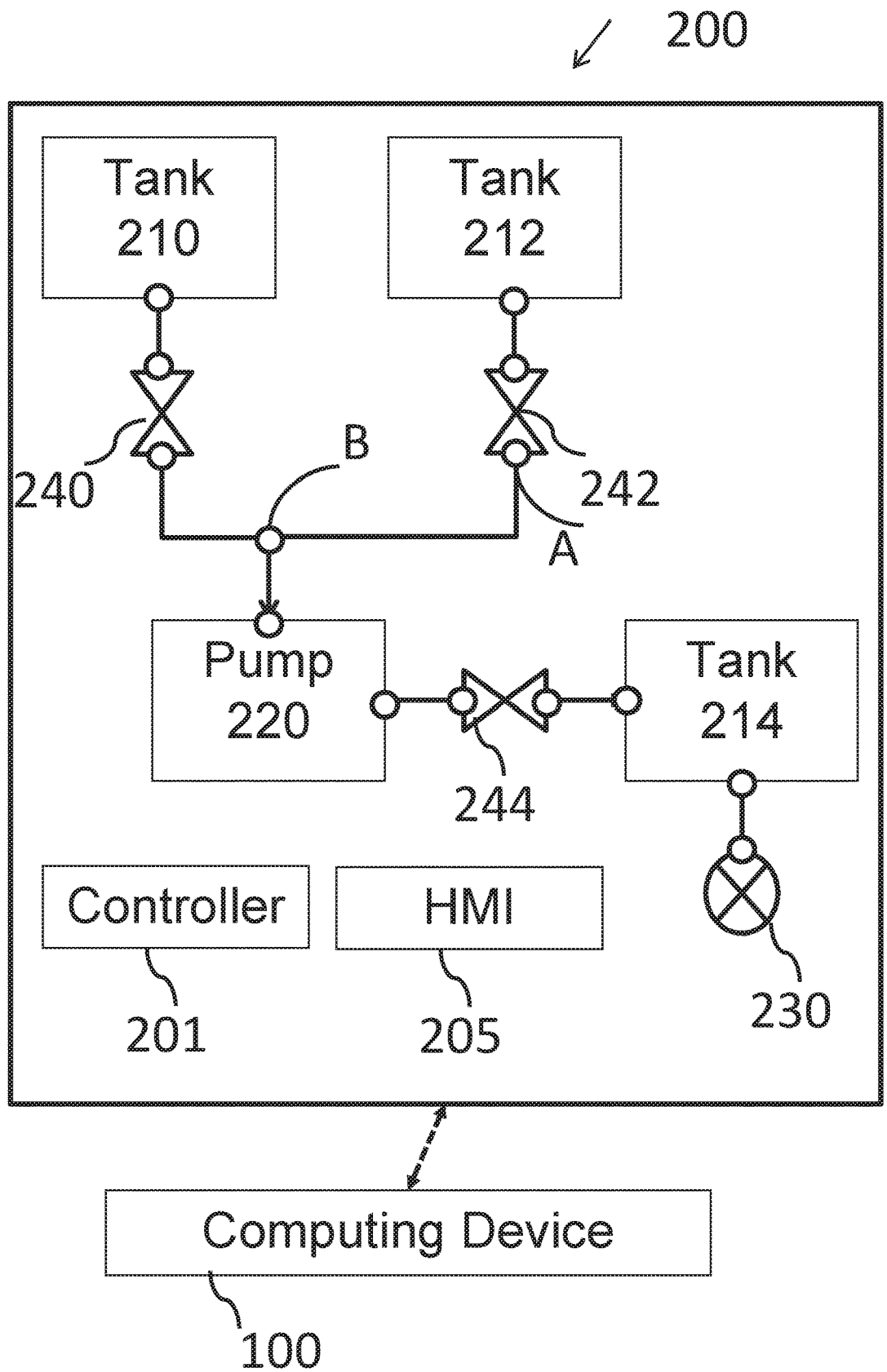
FIG. 2. show graphical presentation of an industrial system according to some embodiments of the invention.

Reference is now made to FIG. 2 which shows a graphical presentation of an industrial system according to embodiments of the invention. The graphical representation of system 200 may include graphical presentations of two or more controllable elements (e.g., tanks, valves, taps, pumps, etc.). Graphical presentation of an industrial system 200 and/or the graphical presentations of two or more controllable elements may be received from a Human Machin Interface 205 (HMI) of the industrial system 200 being in communication with controller 201. Additionally or alternatively, a graphical presentation of an industrial system 200 and/or the controllable elements may be received from any database, for example, storage 130 (in FIG. 1) at any format, for example GIF, TIF, PDF and the like.

Industrial system 200 may include two or more controllable elements, for example, tanks 210, 212 and 214, a pump 220, valves 240, 242 and 244 and tap 230. In some embodiments, at least some of the elements of system 200 may be controlled by controller 201 (e.g., a PLC controller). As should be understood by one skilled in the art, the elements shown in FIG. 2 are given as examples only, and the invention as a hole is not limited to particular controllable elements or a particular number of these elements. As used herein, a controllable element in an industrial system may be any element/device that may be controlled by a controller (e.g., controller 201), such as: taps, valves, tanks, pumps, stirrers, power suppliers, fans and the like.

In some embodiments, controller 201 may be configured to communicate, either wirelessly or by wired communication with communication unit 145 of device 100. In some embodiments, controller 201 may receive PLC or similar codes to be automatically programmed into controller 201, from device 100 via communication unit 145. In some embodiments, controller 201 may include software modules of each of controllable elements included in system 200. Each software module may include, parameters and instructions for operating the controllable element. For example, a software module for a valve (e.g., valves 240, 242 and 242 and 244) may include instructions to open or close the valve, a duration from opening to closure, the aperture of opening the valve in order to control the flowrate and the like. In case the valve is coupled to a sensor (e.g., a thermometer, a barometer, a flowmeter and the like), the software module may include instructions to open the valve only when a property (e.g., temperature) sensed by the sensor reached a threshold value (e.g., 85° C.) or goes below a threshold value (e.g., when pressure sensed by a barometer in a tank goes under 2 bar).

Figure 3:
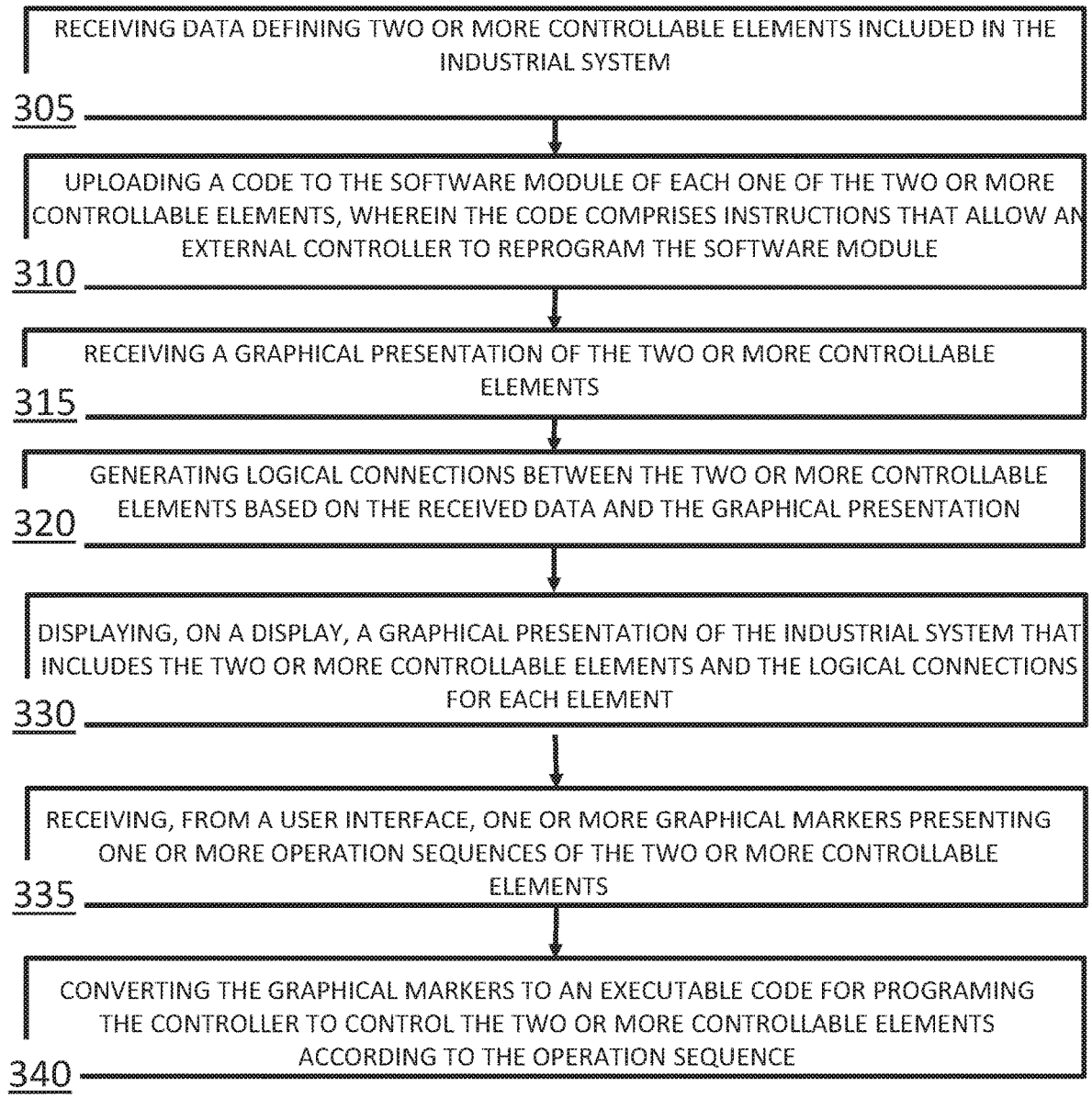
FIG. 3 shows a flowchart for a method of programing a controller of an industrial system, according to some embodiments of the invention.

Reference is now made to FIG. 3 which is a flowchart of a computerized method of programing a controller of an industrial system according to some embodiments of the invention. The method of FIG. 3 may be executed by controller 105 of computing device 100 or by any other suitable controller. In step 305, data defining two or more controllable elements included in the industrial system may be received from the controller of the industrial system. Controller 105 may communicate with controller 201 to extract data defining two or more controllable elements. The data may include elements type (e.g., tank, pump, valve, stirrer and the like), operation parameters (e.g., volumes, pressures, capacities, temperatures, flow-rates, power, current, voltage and the like), timing, schedule, sub-operations sequences, and the like. In some embodiments, additional data may be received from a database (e.g., in storage 130) storing data related to controllable elements and/or may be uploaded by a user via a user interface. The data may further include a flow direction between connection points of each element, from which the element may be connected to other elements (e.g., entrances, exits, etc.). For example, the data may include the flow direction from the entrance to the exit in a tank, from two entrances to a single exit in a 3-way valve and the like. In some embodiments, controller 201 may include software modules of each controllable element. In some embodiments, the data may be received from a user, for example, via a user interface. For example, the flow directions between at least two connection points may be defined by a user, using a designated GUI.

In step 310, a code may be programed to the software module of each one of the two or more controllable elements. Controller (e.g., 105 in FIG. 1) of a computing device such as computing device 100 in FIG. 1, may be in active communication with a controlled industrial system such as industrial system 200 in FIG. 2, and may send two or more codes to controller 201, wherein each code may include instructions (e.g., communication connections) that may allow an external controller (e.g., controller 105) to reprogram the software module of each of the two or more controllable elements. Such codes may allow controller 105 to automatically reprogram each software module in controller 201 without the need to call a programmer. Accordingly, a system and method according to embodiments of the invention may reduce human errors and may reduce the programing time.

Figure 4A:
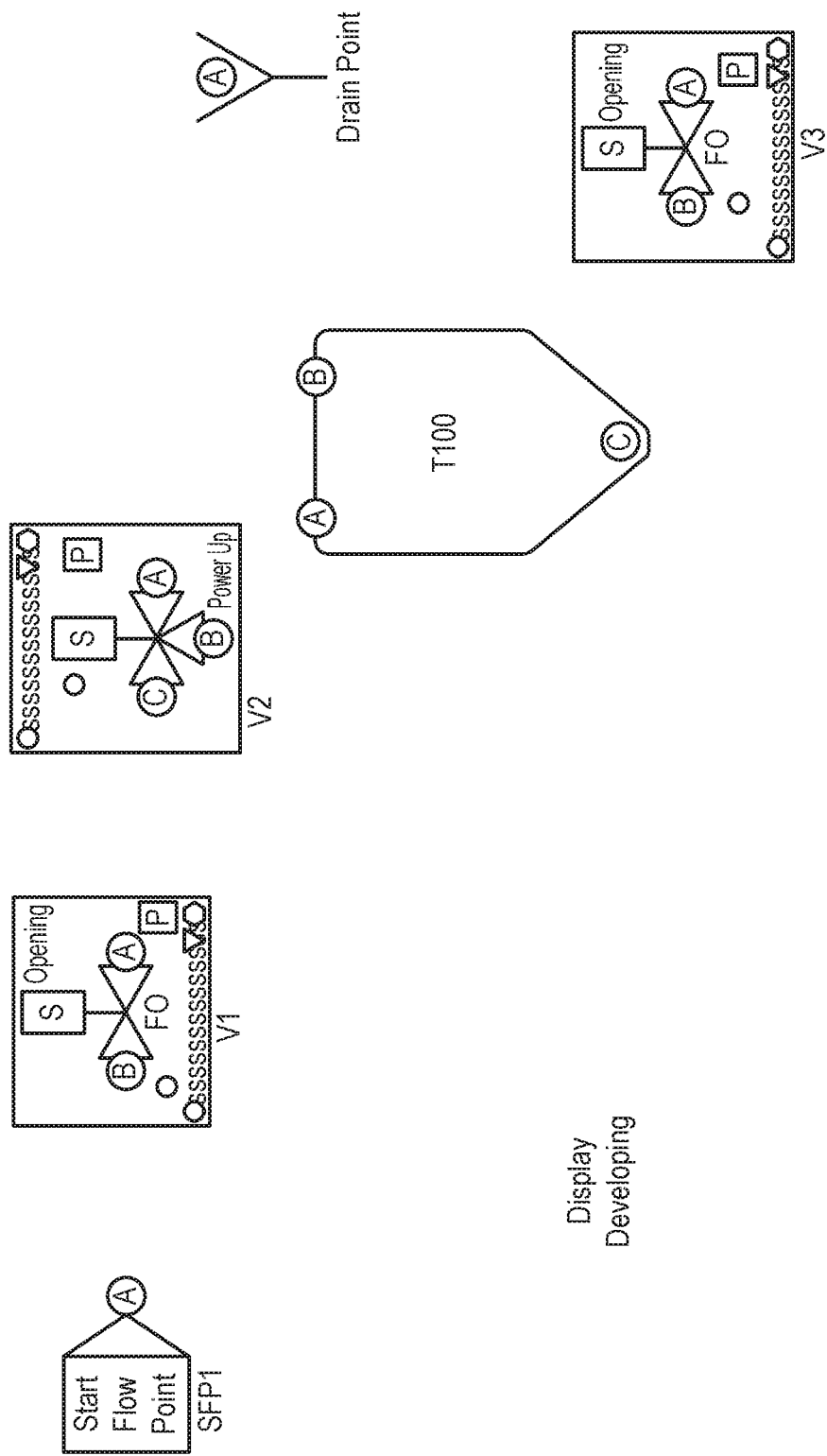
FIGS. 4A, 4B and 4C are illustrations of graphical presentations according to some embodiments of the invention.

In step 315, a graphical presentation of the two or more controllable elements may be received. For example, controller 105 may receive from an HMI module 205 associated with controller 201 graphical presentation of the two or more controllable elements, as illustrated in FIG. 4A. The HMI module may be configured to generate and graphically present the operation of the controllable elements of system 200 both off-line and in real time. Additionally or alternatively, controller 105 may be configured to receive the graphical presentation (e.g., the graphical presentation illustrated in FIG. 2) in any known graphical format, PDF, TIF, GIF, DWG, etc. The graphical presentation may be a scanned plan of industrial system 200. In some embodiments, controller 105 may conduct image analyses of the received graphical presentation to identify within the graphical presentation the various elements of the system (e.g., the two or more controllable elements included in the industrial system). The image analysis may be conducted using any method known in the art.

In step 320, logical connections between the two or more controllable elements may be generated based on the received data and the graphical presentation. Controller 105 may analyze the data received from controller 201 (and optionally also from a database stored in a remote or in premises storage, such as storage 130) and the graphical presentation to determine the location and number of connection points for each controllable element. In some embodiments, generating logical connection between the two or more controllable elements may include identifying the connection points of each controllable element, form the graphical presentation, for example by identifying using an image analysis the entrances and exits from the controllable element. For example, a drain may have a single connection point (e.g., entrance), a valve may have two or more connection points (at least one entrance and at least one exit) and a centrifugal separator may have three or more connection points, an entrance and at least two exits for the separated products. In some embodiments, generating logical connection may further include defining a flow direction between at least two of the identifying connection points, based on the received data, for example, based on inputs received from a user or data received from a database.

In some embodiments, a graphical model of the industrial system may be received, for example, form a database. The graphical model may be generated using an CAD software and may be received using any known graphical format, PDF, TIF, GIF, DWG, etc. In some embodiments, the logical connections may also be generated based on the graphical presentation of the industrial system. For example, controller 105 may analyzed the connection between the controllable elements included in the graphical presentation to determine at least one of: the connection points and the flow direction between points.

Figure 4B:
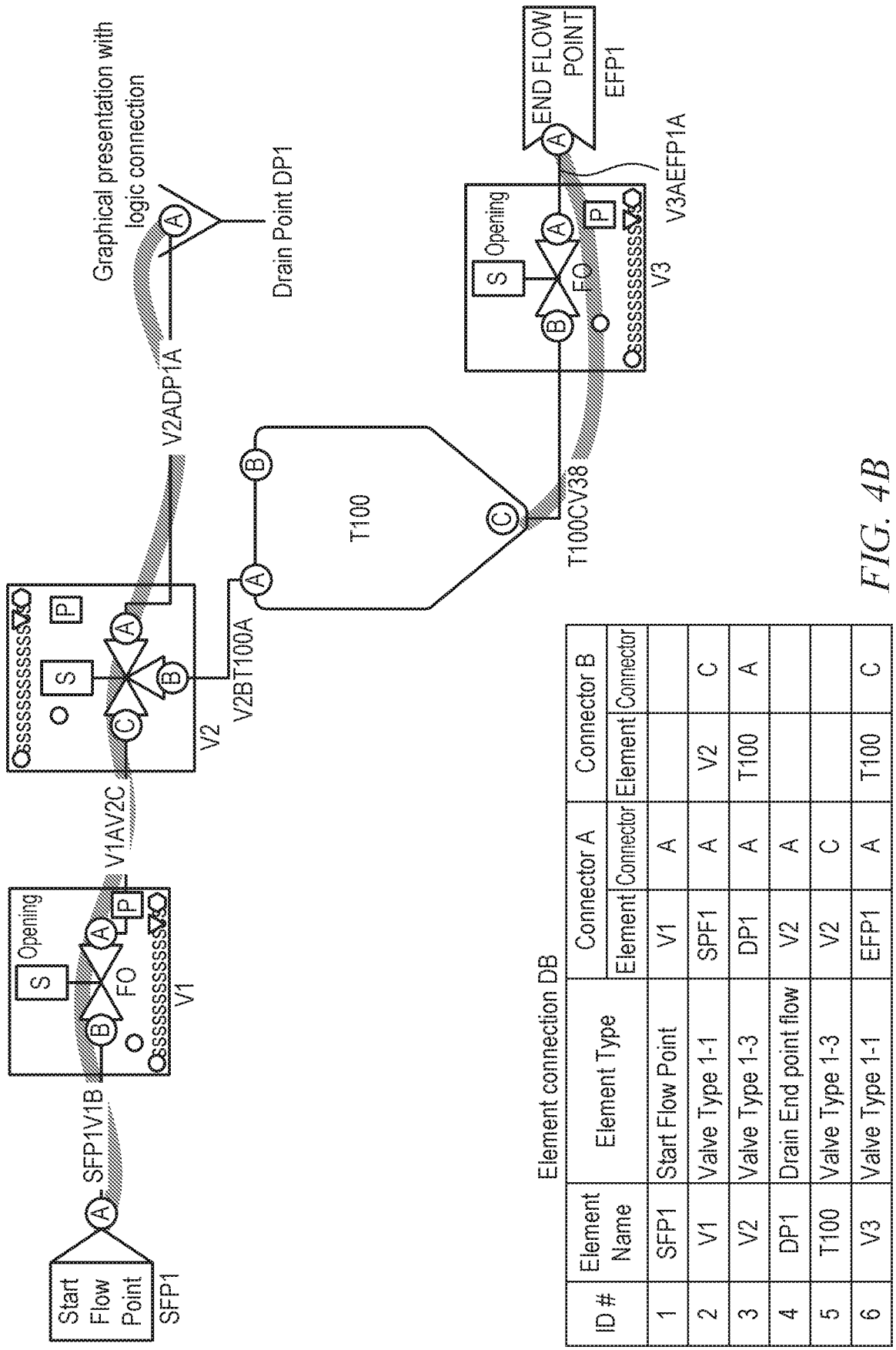

For example, a GUI or HMI included in system 100 may display the graphical model of industrial system 200 to a user, the user may use a pointing device (e.g., a mouse, a finger or a stylus on a touchscreen and the like) to logically connect two controllable elements, for example, as illustrated in FIG. 4B a user may point on point A of valve V1 (e.g., by double clicking) following by pointing on point C of valve V2, thus forming a logical connection between the exit (A) of valve V1 and the entrance (C) of valve V2. In some embodiments, when the logical connection is a flow pipe, the use may further define parameters of the flow pipe, such as type, diameter and the like, of the connection, for example, by opening a popup menu that includes the parameters. In some embodiments, the identification (e.g., name) and parameters of each logical connection may be saved in a lookup table, for example, the table illustrated in FIG. 4B.

In step 330, a graphical presentation of the industrial system that includes the two or more controllable elements and the connection points for each element may be displayed on a display (e.g., output device 140), as illustrated in FIG. 4A the connection points are marked with the letters A, B, C, etc. In some embodiments, the user may further use a pointing device to rearrange the location and order of the two or more controllable elements, on the graphical presentation, according to a desired plan, for example, by using drag and drop method.

Figure 4C:
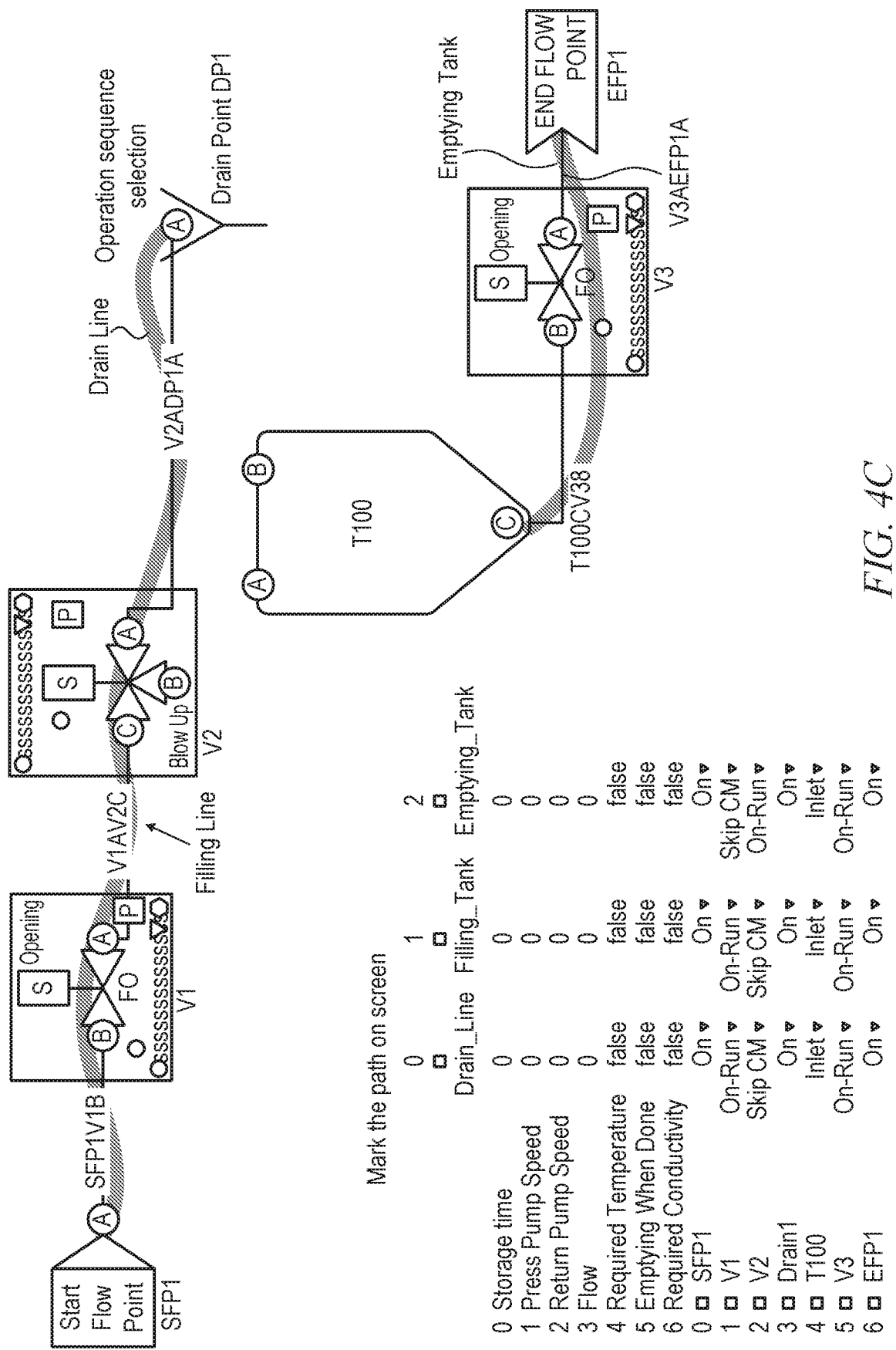

In step 335, one or more graphical markers (e.g., lines, stars, circles, letters, etc.) presenting an operation sequence of the two or more controllable elements may be received from a user interface. In some embodiments, the user may use any pointing device (e.g., a mouse, a finger/pen on a touchscreen and the like) to connect two or more controllable elements, by for example, drawing a line from the one connecting point of a first element to a connecting point of a second element, as illustrated in FIG. 4C. This connection may define an operation sequence of the two or more elements.

Referring back to FIG. 2, a user may draw a first line going from the connecting point of tank 210, via valve 240 into pump 220. The first line will define, a first operation sequence defining that valve 240 may be opened before pump 220 starts to pump liquid from tank 210. In yet another example, a second line may be drawn from connecting point of tank 212, via valve 242 into pump 220, defining a second operation sequence. All the defined operation sequences may be saved in a lookup table (e.g., lookup table illustrated in FIG. 4C) in a form of a matrix. Each lookup table may include a selected number of operation sequences. In some embodiments, the user may select a specific lookup table to be used, or controller 105 may automatically select a table configured to perform a specific task, for example, cleaning a tank and/or a pipeline.

The user may define either graphically or in each table if the operation sequences defined by the first and second draw lines are to be executed in parallel, sequentially, with a delay and the like. In some embodiments, one or more additional graphical markers presenting one of: operation sub-sequences and operation parameters of the two or more controllable elements may be received from a user interface. For example, sub-sequences of a specific controllable element, for example, tank 210, may be received. The user may select (e.g., form a popup menu) a sub-sequence that includes for example, heating the liquid in tank 210 to 80° C. and increasing the pressure inside tank 210 to 2 bars prior to the opening of valve 240. In some embodiments, if an element is selected to be included in the operation sequences at least some of the parameters for operating the element can be selected by the user (e.g., form a popup menu). For example, if a valve is controlled by a sensor (e.g., a barometer) the user may select at which pressure to open the valve.

In some embodiments, the operation sequence may be configured to perform a predetermined task, for example, cleaning tank 214. Accordingly, all the various steps/operations defined may result in the cleaning of tank 214.

In step 340, the graphical markers may be converted to an executable code configured to automatically program the controller to control the two or more controllable elements according to the operation sequence. In some embodiments, controller 105 may convert one or more operation sequences defined by the graphical markers (e.g., the first and second draw lines) into PLC codes configured to program controller 201. In some embodiments, the converted operation sequence may further be uploaded to the UMI module associated with controller 201. Therefore, when system 200 is operated according to the one or more operation sequences, the UMI module may display the real-time operation on a display associated with controller 201, or any other display.

In some embodiments, prior to executing the code converted from the graphical markers, controller 105 and/or controller 201 may determine the state and/or status of each controllable element to be operated to perform the operation sequence. For example, controller 105 and/or controller 201 may identify the flow direction of a valve, the level and type of fluid in a tank, whether a pump is operating or not and the like. In some embodiments, controller 105 and/or controller 201 may generate one or more codes (e.g., PLC codes) that may control each element to be in state and/or status required in order to initiate the operation sequence.

In some embodiments, a specific product may be manufactured by industrial system 200. Accordingly, controller 105/controller 201 may receive a request to manufacture the specific product, using industrial system 200. In some embodiments, the request may include: a definition of one of a number of units of a specific product or a predetermined amount (e.g., volume, weight, etc.) of the specific product; and a list and amounts of at least one of: ingredients and components for manufacturing the specific product. In some embodiments, the operation sequence may be amended or updated to manufacture the specific products. For example, the specific product may be 100 litters of ready to drink herbal tea and the request may include the amount (e.g., in Kg.) of different herbs, the amount of water (e.g., in litters), the amount of sweetener and the like. In some embodiments, the operation sequence may be updated with the instructions required for producing the herbal tea.

In some embodiments, the computerized method of FIG. 3 may include a simulation step to be conducted before uploading the generated PLC code into controller 201 of system 200. In some embodiments, a simulated model of the industrial system operated according to the received operation sequence may be generated, for example, offline. The model may include all the controllable elements, their operation parameters, the defined connection pints, the logical connections and the defined one or more operational sequences. This generated simulated model may be use for assessing the one or more operation sequences (e.g., included in a single table or task) based on a product of the simulated model. If the simulation yields that the operation sequence will not yield the required result or that an additional optimization is required, steps 330-340 may be repeated.

In some embodiments, controller 201 of the industrial system may be automatically programmed with the executable code. Controller 105 may provide, e.g., via communication unit 145, the executable code to controller 201 together with a code instructing controller 201 reprogram the software modules of the two or more controllable elements to execute the one or more operation sequences.

In some embodiments, one or more lookup tables may be created (e.g., the lookup table illustrated in FIG. 4C), each including one or more operation sequences. Each table may be configured to perform a task or several tasks. In some embodiments, a lookup table to be uploaded to controller 201 may be selected by the user, via a user interface or may be automatically selected to perform a specific task, for example, when the time comes to clean a tank, the system may automatically upload a table that includes all the operation sequences required for cleaning the tank.

In some embodiments, controller 105 may work online or offline from controller 201 and system 200. Controller 105 may perform steps 315-340 offline, while not being connected to controller 201. Accordingly, the simulation step may also be conducted offline and only after achieving the required result (the optimized operation) controller 105 may be reconnected to controller 201 (via unit 145) to upload the executable code.

In some embodiments, controller 105 may continuously be connected to controller 201 and system 200 for collecting information and data from the various controllable elements, for example, for conducting quality control. In some embodiments, controller 105 may collected data regarding the performance of each operation sequence during a period of time. Controller 105 may define a typical or expected behavior of each operation sequence, for example, the expected time for the operation of each sequence, average temperature, average pressures and the like. Controller 105 may send an alert each time there is a deviation from the expected behavior (under defined margins). Controller 105 may further continuously present the collected data, on a display included in output device 140.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of generating codes for controlling an industrial system, the method comprising:
   (A) receiving data defining two or more controllable elements included in the industrial system;
   (B) receiving a graphical presentation of the two or more controllable elements;
   (C) generating at least one logical connections between the two or more controllable elements based on the received data and on the received graphical presentation;
   (D) present the two or more controllable elements and the generated at least one logical connection on a screen included in a user interface;
   (E) receiving, from the user interface, one or more graphical markers defining at least one operation sequence of the two or more controllable elements, the one or more graphical markers being indicative of drawing, by a human user, at least one line between representations on the screen of the two or more controllable elements; and
   (F) converting the at least one operation sequence defined by the received one or more graphical markers to an executable code configured to automatically program a controller of the industrial system to control the two or more controllable elements according to the at least one operation sequence.

2. The method according to claim 1, wherein the generating of the at least one logical connection, between the two or more controllable elements, comprises:

(i) identifying connection points for each controllable element, from the graphical presentation, wherein the connection points define a way that the each controllable element can be connected to other elements of the industrial system;
(ii) defining a flow direction between at least two of the identified connection points, based on the received data.

3. The method according to claim 1, further comprising:
(G) receiving a request to manufacture a specific product, using the industrial system; and
(H) updating the at least one operation sequence to manufacture the specific product.

4. The method according to claim 1, further comprising:
(I) generating a simulated model of the industrial system operated according to the at least one operation sequence; and
(J) assessing the at least one operation sequence based on a product of the simulated model, wherein the assessment comprises determining at least one of the following:
whether the at least one operation sequence will not yield a required result; and
whether an additional optimization is required.

5. The method according to claim 1, further comprising:
(K) automatically programming the controller of the industrial system with the executable code.

6. The method according to claim 1, further comprising:
(L) receiving, from a user interface, one or more additional graphical markers presenting one of: operation sub-sequences and operation parameters of the two or more controllable elements.

7. A computerized system configured to generate codes for controlling an industrial system, the computerized system comprising a processor and a non-transitory storage medium, the computerized system comprising:
a user interface,
wherein the processor is configured to:
(A) receive data defining two or more controllable elements included in the industrial system;
(B) receive a graphical presentation of the two or more controllable;
(C) generate at least one logical connection between the two or more controllable elements based on the received data and on the received graphical presentation;
(D) present the two or more controllable elements and the generated at least one logical connection on a screen included in the user device;
receive, from the user interface, one or more graphical markers defining at least one operation sequence of the two or more controllable elements, the one or more graphical markers being indicative of drawing, by a human user, at least one line between representations on the screen of the two or more controllable elements; and
(F) convert the at least on operation sequence defined by the received one or more graphical markers to an executable code configured to automatically program a controller of the industrial system to control the two or more controllable elements according to the at least one operation sequence.

8. The computerized system of claim 7, wherein the processor of the computerized system is further configured to:
(G) upload a code to a software module of each one of the two or more controllable elements, wherein the code comprises instructions that allow an external controller to reprogram the software module.

9. The computerized system according to claim 7, further comprising:
a non-transitory computer readable medium, configured to store thereon instructions to be executed by the processor.

10. The computerized system according to claim 7, wherein the generating of the at least one logical connection between the two or more controllable elements, comprises:
(i) identifying the connection point of each controllable element, from the graphical model; and
(ii) defining a flow direction between at least two of the identified connection points, based on the received data.

11. The computerized system according to claim 7, wherein the processor is further configured to:
(H) receive a request to manufacture a specific product, using the industrial system; and
(I) update the at least one operation sequence to perform the manufacturing of the specific product.

12. The computerized system of claim 11, wherein the receiving of the request to manufacture the specific product comprises:
(I) receiving a definition of one of: a number of units of the specific product or a predetermined amount of the specific product; and
(II) receiving a list and amounts of at least one of: ingredients and components for manufacturing the specific product.

13. The computerized system according to claim 7, wherein the processor is further configured to:
(J) generate a simulated model of the industrial system operated
according to the at least one operation sequence; and
assess the at least one operation sequence based on a product of the simulated model.

14. The computerized system according to claim 7, wherein the processor is further configured to:
(K) automatically program the controller of the industrial system with the executable code.

15. The computerized system according to claim 7, wherein the processor is further configured to:
(L) receive, from the user interface, one or more additional graphical markers presenting one of: operation sub-sequences and operation parameters of the two or more controllable elements.

16. A computerized system configured to generate codes for controlling an industrial system, the computerized system comprising a processor and non-transitory storage medium, the computerized system a user interface,
wherein the processor is configured to:
(A) receive data defining two or more controllable elements included in the industrial system;
(B) receive a graphical presentation of the two or more controllable elements;
(C) perform an image analysis of the received graphical presentation to identify within the graphical presentation the two or more controllable elements;
(D) generate at least one logical connection between the two or more controllable elements based on the received data and on the image analysis of the received graphical presentation;
(E) present the two or more controllable elements and the generated at least one logical connection on a screen included in a user interface;

(F) receive, from the user interface, one or more graphical markers defining at least one operation sequence of the two or more controllable elements; and (G) convert the at least one operation sequence defined by the received one or more graphical markers to an executable code configured to automatically program a controller of the industrial system to control the two or more controllable elements according to the at least one operation sequence.

17. The computerized system according to claim 16, wherein generating the at least one logical connection, between the two or more controllable elements, comprises:

(i) perform, on the received graphical presentation, image analysis of at least one connection between the two or more controllable elements, to identify connection points for each controllable element, wherein the connection points define a way that the each controllable element can be connected to other elements of the industrial system;

(ii) perform, in the received graphical presentation, the image analysis of the at least one connection between the two or more controllable elements, to determine a flow direction between at least two of the identified connection points.

18. The computerized system according to claim 17, wherein the identifying of the connection points for the each controllable element comprises identifying, using the image analysis, at least one entrance and a least one exit from the each controllable element.

19. The computerized system according to claim 16, wherein the graphical presentation comprises a scanned plan of the industrial system, wherein the image analysis is of the scanned plan.

* * * * *